(12) United States Patent
Shida et al.

(10) Patent No.: US 6,834,700 B2
(45) Date of Patent: Dec. 28, 2004

(54) PNEUMATIC RADIAL TIRE WITH SPECIFIED CARCASS STRENGTH COEFFICIENT

(75) Inventors: Zenichiro Shida, Hiratsuka (JP); Yoshiaki Hashimura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 278 days.

(21) Appl. No.: 09/985,076

(22) Filed: Nov. 1, 2001

(65) Prior Publication Data

US 2002/0043321 A1 Apr. 18, 2002

Related U.S. Application Data

(62) Division of application No. 08/930,243, filed as application No. PCT/JP97/00234 on Jan. 31, 1997, now Pat. No. 6,345,658.

(30) Foreign Application Priority Data

Feb. 2, 1996 (JP) .............................................. 8-17934

(51) Int. Cl.$^7$ .............................. B60C 9/08; B60C 9/04; B60C 13/00

(52) U.S. Cl. ........................ 152/554; 152/548; 152/551; 152/555; 152/556; 152/557

(58) Field of Search ................................ 152/555, 554, 152/548, 551, 556, 557

(56) References Cited

U.S. PATENT DOCUMENTS

| | | | |
|---|---|---|---|
| 3,760,858 A | 9/1973 | Grossett | |
| 4,185,675 A | 1/1980 | Greiner et al. | |
| 4,628,978 A | 12/1986 | Imai et al. | |
| 4,688,617 A | 8/1987 | Hopkins et al. | |
| 4,751,952 A | 6/1988 | Imai | |
| 5,173,137 A | 12/1992 | Okihara et al. | |
| 5,361,820 A | 11/1994 | Adachi | |
| 5,490,551 A | 2/1996 | Prakash et al. | |
| 5,658,405 A | 8/1997 | Iseki | |
| 5,688,343 A | 11/1997 | Minami et al. | |

FOREIGN PATENT DOCUMENTS

JP          5-246207 A          9/1993

*Primary Examiner*—Adrienne C. Johnstone
(74) *Attorney, Agent, or Firm*—Rader, Fishman & Grauer PLLC

(57) ABSTRACT

A pneumatic radial tire wherein both end portions of at least one layer of a carcass layer are turned up around right and left bead cores from the inside to the outside of the tire, and at least two layers of belt layers formed by arranging reinforcing cords in such a fashion that their inclining directions with respect to a tire circumferential direction cross one another in mutually opposite directions between the layers are disposed on the outer circumferential side of the carcass layer of a tread portion. A carcass strength coefficient K defined by the formula (1) in the specification is 0.15 to 0.35 N/mm·kPa at portions on the tread portion center side of positions P which are away by 10% of a belt width of a belt layer having the second greatest width from both edges thereof towards its inside, and is 0.5 N/mm·kPa at portions from the positions P to the bead portions.

4 Claims, 2 Drawing Sheets

PNEUMATIC RADIAL TIRE WITH SPECIFIED CARCASS STRENGTH COEFFICIENT

This application is a division of U.S. application Ser. No. 08/930,243 filed Sep. 30, 1997, now U.S. Pat. No. 6,345,658. Which is a 371 of PCT/JP97/00234 Jan. 31, 1997.

TECHNICAL FIELD

This invention relates to a pneumatic radial tire. More particularly, this invention relates to a pneumatic radial tire which can reduce a production cost while keeping tire performance at the same level as that of prior art tires, and particularly to a pneumatic radial tire suitable for passenger cars.

BACKGROUND ART

Generally, pneumatic radial tires are equipped with at least one carcass layer formed by arranging reinforcing cords in a tire radial direction inside a tire as a tire skeletal structure, and this carcass layer keeps a tire internal pressure. At least two belt layers, each of which is formed by arranging reinforcing cords in such a fashion that their inclining directions with respect to a tire circumferential direction cross one another in mutually opposite directions between the layers, are disposed on the outer circumferential side of the carcass layer of a tire tread portion. These belt layers protect the carcass layer from an impact from a road surface and an external damage, and function as a "hoop" keeping rigidity in the tire circumferential direction.

Recently, price competition has become severer and severer in the tire industry, too, and the pneumatic radial tire described above must be produced essentially at a low cost without spoiling conventional tire performance.

DISCLOSURE OF THE INVENTION

It is therefore an object of the present invention to provide a pneumatic radial tire which can attain a lower cost of production while keeping tire performance at the same level as that of conventional pneumatic radial tires.

The pneumatic radial tire according to the present invention for accomplishing the object described above comprises at least one carcass layer formed by arranging reinforcing cords, both end portions of which are turned up from the inside to the outside of the tire round right and left bead cores, respectively, and at least two belt layers formed by arranging reinforcing cords in such a manner that their inclining directions with respect to a tire circumferential direction cross one another in mutually opposite directions between the layers and disposed on the outer circumferential side of the carcass layer of a tread portion, characterized in that a carcass strength coefficient K of the carcass layer defined by the following formula (1) is set so as to satisfy a value of 0.15 to 0.35 N/mm·kPa at portions on the tread portion center side of positions P which are away by 10% of a belt width of a belt layer having the second greatest width from edges thereof towards its inside, and a value of at least 0.5 N/mm·kPa at portions ranging from the positions P to bead portions:

$$K(N/mm \cdot kPa) = [\text{number of reinforcing cords arranged (pcs/mm)}] \times [\text{strength of reinforcing cords }(N)] \times [\text{number of carcass layers}] \div [\text{maximum air pressure (kPa)}] \quad (1)$$

The inventors of the present invention have carried out intensive studies on radial tire structures whose strength design is made on the basis of a maximum air pressure, and have specifically noted that because the belt layers are disposed at the tread portion, the tire internal pressure is kept by the carcass layer and the belt layers in which they bear their share of that. Therefore, the present inventors have realized that the strength of the carcass layer can be reduced at least in the area of the tread portion and a part of the tire internal pressure can be shared by the belt layers.

In other words, in the pneumatic radial tires according to the prior art, the carcass layer must bear the internal pressure at sidewall portions, too, so that the carcass strength has been designed to the strength necessary for reinforcing the sidewall portions. At the tread portion, however, the belt layers bear a part of the tire internal pressure and for this reason, the carcass strength has been greater than necessary in the conventional pneumatic radial tires.

Besides the observation described above, the present inventors have paid a specific attention to the carcass strength coefficient K which is defined by the formula (1) and falls within substantially the same range even when the kinds of the tires are different. As to the two layers of the belt layers formed by so arranging the reinforcing cords as to cross one another, therefore, the present inventors have found that when the carcass strength coefficient K is calculated, the belt layers can bear a strength corresponding to 0.35 N/mm·kPa. Accordingly, in the carcass layer at the tread portion where the belt layers bear a part of the tire internal pressure, the carcass strength coefficient K need not be set to 0.5 N/mm·kPa or more as has been required in the prior art tires, and it has been found out that tire durability can be secured sufficiently even when the value is lowered to the minimum value of 0.15 N/mm·kPa by reducing the number of arrangement of the reinforcing cords (end number), etc. It has been found out also that in order to improve the production cost, the upper limit of the carcass strength coefficient K must be set to 0.35 N/mm·kPa. Further preferably, the coefficient K is within the range of 0.2 to 0.3 N/mm·kPa.

Therefore, in the sidewall areas where a part of the tire internal pressure cannot be borne by the belt layers, the carcass strength coefficient K is set to at least 0.5 N/mm·kPa in the same way as in the prior art tires. The upper limit of this carcass strength coefficient K is preferably 1.5 N/mm·kPa. Even when the carcass strength coefficient K is increased beyond this upper limit, the carcass strength becomes excessive as far as tires for passenger cars in general are concerned and such a strength is meaningless but merely increases the tire weight. However, the carcass strength coefficient K must not be decreased below 0.35 N/mm·kPa in the entire area occupied by the belt layers, and the value of the carcass strength coefficient K of at least 0.5 N/mm·kPa must be maintained at portions up to positions P which are away by at least 10% of the belt width from the edges of the belt layer having the second greatest width toward inside, in the same way as in the sidewall areas. On the other hand, the area in which the carcass strength coefficient K is set to 0.15 to 0.35 N/mm kPa at the tread portion as described above need not be the area corresponding to the belt layers, but may be the area on the tire center side of the positions P described above.

As described above, the carcass strength coefficient is smaller than in the prior art tires at the tread portion at which the belt layers bear a part of the tire internal pressure and consequently, the number of arranged reinforcing cords of the carcass layer, the diameter of the reinforcing cords, the number of the carcass layers, etc, can be reduced. Therefore, the material cost can be reduced, and the reduction of the production cost as well as the tire weight can be accomplished.

Moreover, even when the materials of the carcass layer are reduced as described above, carcass durability required at the tread portion can be secured, and the drop of tire performance does not occur.

BEST MODE FOR CARRYING OUT THE INVENTION

Figure 1:
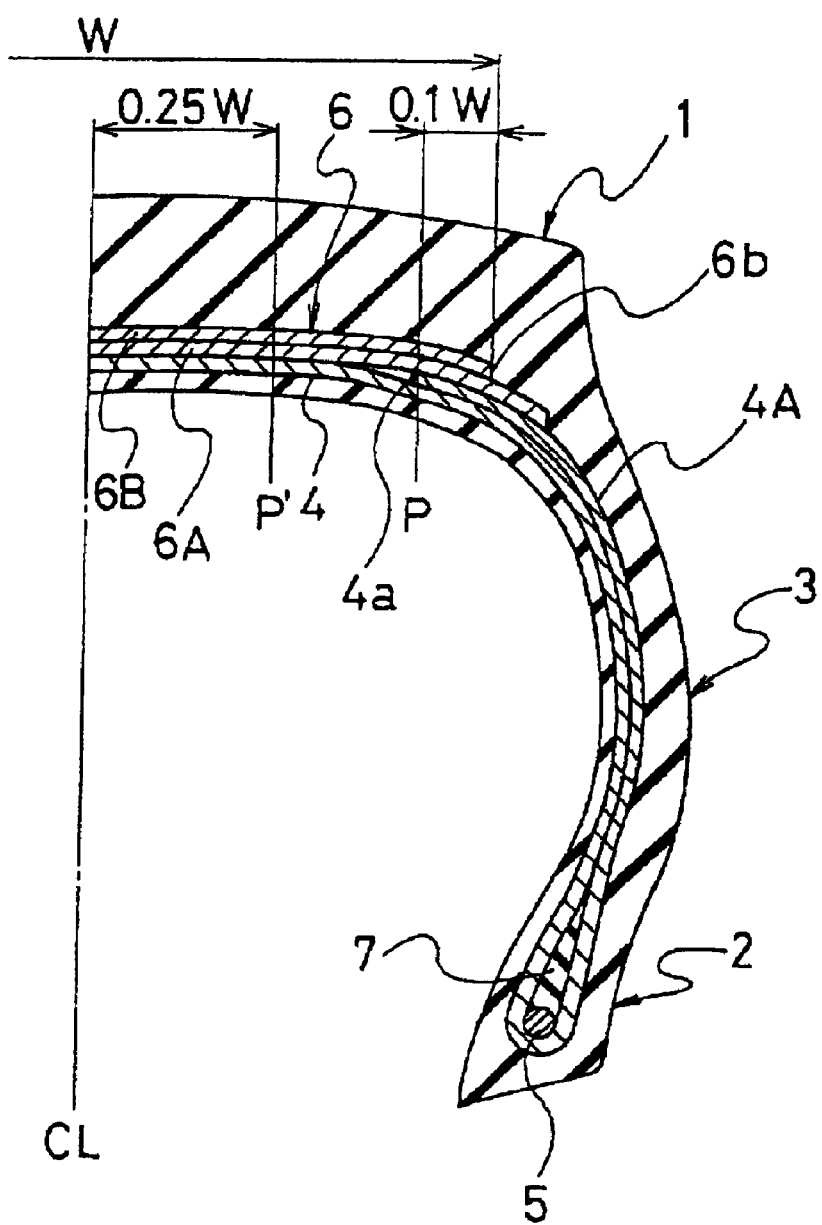
FIG. 1 is a tire meridian half-sectional view showing an example of a pneumatic radial tire for a passenger car according to the present invention.
Figure 2:
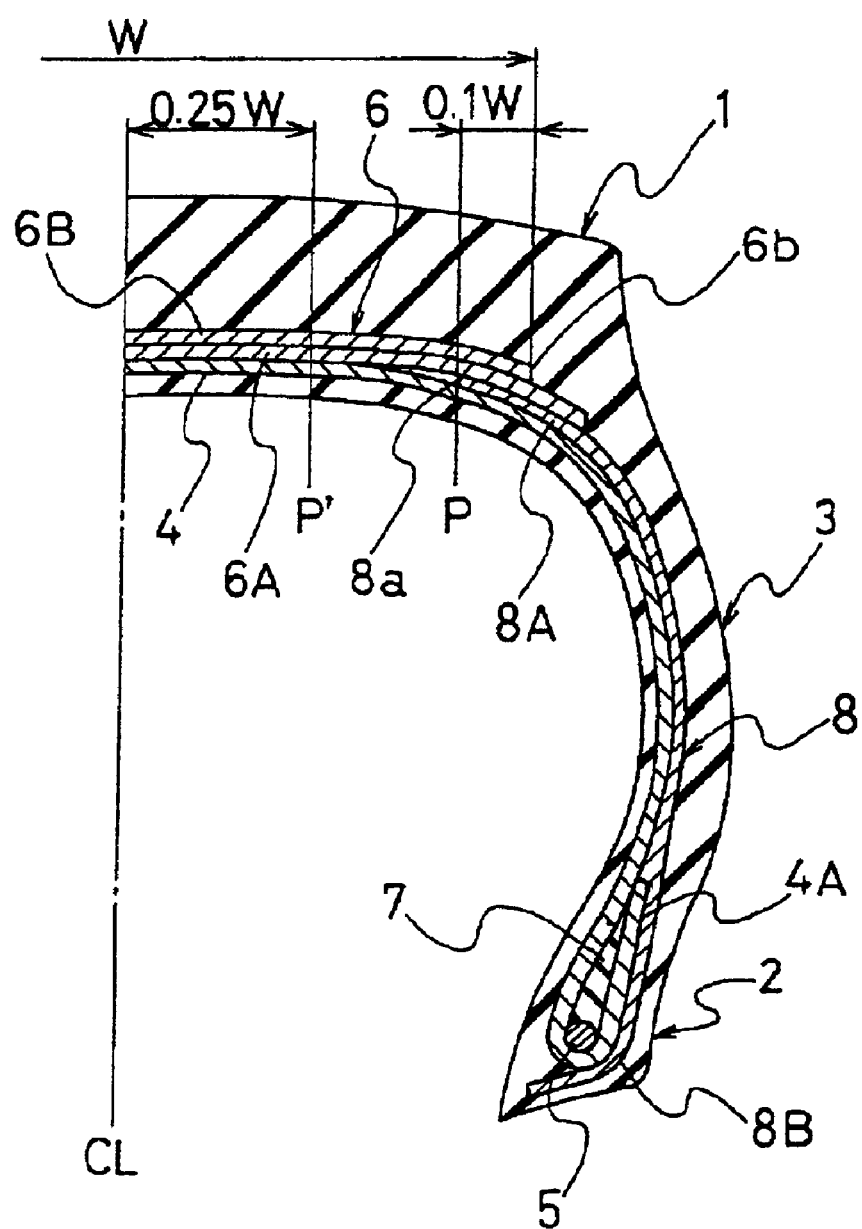
FIG. 2 is a tire meridian half-sectional view showing another example of the pneumatic redial tire for a passenger car according to the present invention.

In FIGS. 1 and 2, reference numeral 1 denotes a tread portion, reference numeral 2 denotes a bead portion and reference numeral 3 denotes a sidewall portion. One carcass layer 4 formed by arranging reinforcing cords in a tire radial direction is disposed inside a tire. A ring like bead core 5 is provided to each of the right and left bead portions 2 and a ring-like bead filler 7 is so disposed as to continue from the outer periphery of each bead core 5. Both end portions 4A of the carcass layer 4 are turned up from the inside to the outside of the tire around the bead cores 5 in such a manner as to clamp bead fillers 7, respectively. Two layers of belt layers 6 are buried on the outer peripheral side of the carcass layer at the tread portion 1. This belt layer 6 comprises an inner first belt layer 6A disposed adjacent to the carcass layer 4 and a second belt layer 6B disposed outside the first belt layer 6A. The second belt layer 6B has a smaller width than the first belt layer 6A. These two belt layers 6 are substantially the same as the belt layers of conventional tires and are designed to bear a strength corresponding to 0.35 N/mm·kPa in terms of a carcass strength coefficient. Symbol CL denotes a tire center line passing through a tire equatorial plane.

In the pneumatic tire having the construction described above, the carcass layer 4 at the tread portion 1 has the carcass strength coefficient K defined by the aforementioned formula (1) which is within the range of 0.15 to 0.35 N/mm·kPa in a tread portion area on the tire center side of positions P of the tread portion 1, which are away by 10% of the belt width W, from both edges 6b of the second belt layer (the belt layer having the second greatest width) 6B, respectively toward inside. On the other hand, the carcass strength coefficient of the carcass layer 4 so disposed as to extend to the bead portions 2 continuing from the sidewall portions 3 from the positions P is set to at least 0.5 N/mm·kPa.

However, the number of carcass layers in the formula (1) is counted as two layers at the portions where the carcass layer is turned up to double. The term "maximum pneumatic pressure" represents the air pressure corresponding to the maximum load capacity stipulated by JATMA (The Japan Automobile Tire Manufacturers Association).

The carcass strength coefficient K can be made different in the tire radial direction as described above by extending both turn-up end portions 4A of the carcass layer 4 to the tread portion 1 so that their edges 4a reach the positions P as shown in FIG. 1. In other words, the portion of the tire from each position P to each sidewall portion 3 has a double-layered structure in which the carcass layer 4 is turned up, while the tread portion 1 on the center side of each position P has a single-layered structure. Therefore, when the carcass strength coefficient K of the carcass layer 4 disposed as a single layer is set to 0.25 to 0.35 N/mm kPa, the carcass strength coefficient on the side of the sidewall portion from the position P of the tread portion 1 becomes 0.5 to 0.7 N/mm kPa and can satisfy the range described above.

In place of the construction described above in which both turn-up end portions 4A of the carcass layer 4 are extended to the tread portion 1, it is also possible to employ the construction wherein at least one carcass reinforcing layer 8 formed by arranging the reinforcing cords in a tire radial direction in the same way as the carcass layer 4 is disposed outside the carcass layer 4 of each sidewall portion 3, as shown in FIG. 2. This carcass reinforcing layer 8 extends to the tread portion 1 so that its edge 8a of its outer circumferential side 8A reaches the position P whereas the inner circumferential edge portion 8B thereof extends to a portion on the inner side of each bead core 5 in the tire radial direction. The carcass strength coefficient K can be set to the range described above by disposing the carcass reinforcing layer 8 in this way, too.

Incidentally, the carcass strength coefficient K of the carcass layer 4 on the sidewall portion from each position P is the sum of the carcass strength coefficient K of the carcass layer 4 and the carcass strength coefficient K of the carcass reinforcing layer 8. The carcass strength coefficient K of the carcass reinforcing layer 8 can be obtained by substituting the numbers of the carcass reinforcing layers 8 for the number of the carcass layer in the formula (1).

The present invention can employ the combination of the constructions shown in FIGS. 1 and 2, that is, the construction where both turn-up end portions 4A of the carcass layer 4 are extended to the points P plus the construction where the carcass reinforcing layers 8 are disposed outside both turn-up end portions 4A of the carcass layer 4.

In the present invention described above, the belt layers 6 share and bear a part of the tire internal pressure at the tread portion 1 where the belt layers 6 are disposed. Therefore, even when the strength of the carcass layer 4 is lowered below that of the conventional tires, tire durability does not get deteriorated. From this aspect, the carcass strength coefficient K of the carcass layer 4 in the area corresponding to the belt layers can be set to the minimum value of 0.15 N/mm·kPa which is smaller than the values of the conventional tires. Since the number of arranged reinforcing cords of the carcass layer 4 and the number of layers or the diameter of the reinforcing cords can be reduced in this way, the materials used can be drastically reduced, and the production cost can be reduced.

The carcass strength coefficient K is set to at least 0.5 N/mm·kPa in the area in which the belt layers 6 are not disposed or speaking more correctly, in the carcass layer 4 between the position P and the bead portion 2, in the same way as in the conventional tires. As a result, tire durability can be kept at the same level as that of the conventional tires, and tire performance can be kept at the same level as that of the conventional tires, too.

If the carcass strength coefficient K of a portion on the sidewall side of the position P described above is smaller than 0.5 N/mm·kPa in the present invention, rigidity of the sidewall portion drops and tire performance such as maneuvering stability gets deteriorated. The range that has been used in the past can be used as the upper limit without particular limitation, but the value is preferably 1.5 N/mm·kPa for the reasons described above.

Any materials which have been used for the conventional tires can be used without particular limitation for the reinforcing cords of the carcass layer 4. Organic fiber cords such as the polyester cords and the nylon cords can be used preferably. Similar materials to those of the carcass layer 4 can be used for the reinforcing cords of the carcass reinforcing layer 8.

The number of arranged cords when the polyester cords are used for the reinforcing cords, for example, is 11 to 26 (pcs/50 mm) at a portion on the center side of the tread portion of the position P in the case of 1,000 d/2 cords and is 8 to 19 (pcs/50 mm) in the case of 1,500 d/2 cords, and at a portion on the sidewall side of the position P, the number is at least 37 (pcs/50 mm) in the case of the 1,000 d/2 cords and is at least 27 (pcs/50 mm) in the case of the 1,500 d/2 cords at the maximum air pressure of 230 kPa.

When the nylon cords are used, the number of arranged cords at the maximum air pressure of 230 kPa is 12 to 27 (pcs/50 mm) at a portion on the tread center side of the position P in the case of 840 d/2 cords and is 7.5 to 18 (pcs/50 mm) in the case of 1,260 d/2 cords, and the number is at least 39 (pcs/50 mm) at a portion on the sidewall side of the position P in the case of the 840 d/2 cords and is at least 25.5 (pcs/50 mm) in the case of the 1,260 d/2 cords.

Incidentally, the term "number of arranged cords at a portion on the sidewall side of the position P" represents the sum of the number of arranged reinforcing cords of the carcass layer 4 at the sidewall portion before turn-up and the number of arranged reinforcing cords of the carcass layer 4 on the turn-up side. In the case of the construction where the carcass reinforcing layer 8 is disposed as shown in FIG. 2, the term represents the sum of the number of arranged reinforcing cords of the carcass layer 4 and the number of arranged reinforcing cords of the carcass reinforcing layer 8.

In the embodiment of the present invention described above, both edges 4a of the carcass layer 4 or the edges 8a of the outer circumferential side edge portions 8A of the carcass reinforcing layer 8 are extended to the positions P, but the edges 4a and 8a can be extended beyond the positions P in such a manner as not to extend beyond the position P' which is away by 25% of the belt width W of the second belt layer 6B from the tire center line CL outward in the tire width-wide direction, and the carcass strength coefficient K of the carcass layer in the area from at least the position P of the tread portion to the bead portions may be set to at least 0.5 N/mm kPa. The edges are preferably extended symmetrically but may be extended asymmetrically, too.

Though the embodiment given above represents the case where only one carcass layer 4 is disposed, the number of the carcass layer 4 is not particularly limited thereto and a plurality of carcass layers 4 may be disposed, as well.

The belt layers 6, too, are not particularly limited to two layers, and a greater number of belt layers 6 may be disposed, as well. The present invention can be used preferably for a pneumatic radial tire equipped with at least one carcass layer 4 and two belt layers 6, particularly for a pneumatic radial tire for passenger cars.

EXAMPLE

Tires according to the present invention (present tires) 1 to 9, comparative tires 1 to 4 and a prior art tire, each having a common tire size of 165SR13 and having a construction tabulated in Table 1, were produced, respectively.

A durability evaluation test of a carcass layer of each of these test tires in a tread portion area on the tire center side of the position P (hereinafter called the "belt portion") and in an area on the sidewall side of the position P (hereinafter called the "side portion") was conducted and the production cost was evaluated, under the following measurement condition. The results shown in Table 1 were obtained.

Carcass Durability:

Each test tire was fitted to a rim having a rim size of 13×41/2-J and was subjected to an indoor drum test at an air pressure of 230 kPa, a load of 9.3 kN, a speed of 80 km/hr and a room temperature of 38° C. After driving 5,000 km, the existence of breakage of the reinforcing cords of the carcass layer (inclusive of the carcass reinforcing layer when it was disposed) at the belt portion and the side portion was measured. O represents that breakage did not exist and x represents that breakage occurred.

Production Cost:

The material cost of the carcass layer and the carcass reinforcing layer used for each test tire was calculated and the result was evaluated by an index value using the material cost of the prior art tire as 100. The smaller this value, the lower the production cost.

TABLE 1

|  |  | present tire 1 | present tire 2 | present tire 3 | present tire 4 | present tire 5 | present tire 6 | present tire 7 | present tire 8 | present tire 9 |
|---|---|---|---|---|---|---|---|---|---|---|
| structure |  | FIG. 2 | FIG. 2 | FIG. 1 | FIG. 2 | FIG. 2 | FIG. 2 | FIG. 2 | FIG. 2 | FIG. 1 |
| carcass layer | cord material | polyester | polyester | polyester | polyester | nylon | nylon | polyester | polyester | polyester |
|  | cord spec. | 1000d/2 | 1000d/2 | 1000d/2 | 1500d/2 | 840d/2 | 1260d/2 | 1000d/2 | 1000d/2 | 1000d/2 |
|  | belt portion, the number of arranged cords (pcs/50 mm) | 11 | 18.5 | 18.5 | 13.5 | 19.5 | 13 | 25.5 | 15.5 | 18.5 |
|  | side portion, the number of arranged cords (pcs/50 mm) | 13 | 22 | 44 | 16 | 23.5 | 15.5 | 30 | 18.5 | 44 |
| reinforcing layer | cord material | polyester | polyester | — | polyester | nylon | nylon | polyester | polyester | — |
|  | cord spec. | 1000d/2 | 1000d/2 | — | 1600d/2 | 840d/2 | 1260d/2 | 1000d/2 | 1000d/2 | — |
|  | number of arranged cords (pcs/50 mm) | 31 | 22 | — | 18 | 23.5 | 15.5 | 14 | 18.5 | — |
| carcass strength coefficient at belt portion (N/mm · kPa) |  | 0.15 | 0.25 | 0.25 | 0.25 | 0.25 | 0.25 | 0.35 | 0.21 | 0.25 |
| carcass strength coefficient at side portion (N/mm · kPa) |  | 0.6 | 0.6 | 0.6 | 0.6 | 0.6 | 0.6 | 0.6 | 0.5 | 0.6 |
| edge position (%) |  | 0.1 W | 0.1 W | 0.1 W | 0.1 W | 0.1 W | 0.1 W | 0.1 W | 0.1 W | 0.25 W |
| carcass durability at belt portion |  | ○ | ○ | ○ | ○ | ○ | ○ | ○ | ○ | ○ |
| carcass durability at side portion |  | ○ | ○ | ○ | ○ | ○ | ○ | ○ | ○ | ○ |
| cost |  | 94 | 97 | 92 | 97 | 97 | 96 | 99 | 92 | 99 |

TABLE 1-continued

|  |  |  | compara-tive tire 1 | compara-tive tire 2 | compara-tive tire 3 | compara-tive tire 4 | prior art tire |
|---|---|---|---|---|---|---|---|
| structure |  |  | FIG. 2 | FIG. 2 | FIG. 2 | FIG. 2 | — |
| carcass layer | cord material |  | polyester | polyester | polyester | polyester | polyester |
|  | cord spec. |  | 1000d/2 | 1000d/2 | 1000d/2 | 1000d/2 | 1000d/2 |
|  | belt portion, the number of arranged cords (pcs/50 mm) |  | 7.5 | 29 | 18.5 | 25.5 | 37.6 |
|  | side portion, the number of arranged cords (pcs/50 mm) |  | 9 | 34.5 | 22 | 30.5 | 44.5 |
| reinforcing layer | cord material |  | polyester | polyester | polyester | polyester | — |
|  | cord spec. |  | 1000d/2 | 1000d/2 | 1000d/2 | 1000d/2 | — |
|  | number of arranged cords (pcs/50 mm) |  | 35 | 9.5 | 7 | 13.5 | — |
| carcass strength coefficient at belt portion (N/mm · kPa) |  |  | 0.1 | 0.4 | 0.25 | 0.35 | 0.51 |
| carcass strength coefficient at side portion (N/mm · kPa) |  |  | 0.6 | 0.6 | 0.4 | 0.6 | 0.81 |
| edge position (%) |  |  | 0.1 W | 0.1 W | 0.1 W | 0 | — |
| carcass durability at belt portion |  |  | x | ○ | ○ | x | ○ |
| carcass durability at side portion |  |  | ○ | ○ | x | ○ | ○ |
| cost |  |  | 93 | 100 | 89 | 98 | 100 |

Remarks)
(1) The prior art tire had the structure shown in FIG. 2, but without the carcass reinforcing layer.
(2) The difference between the numbewrs of arranged reinforced cords of the carcass layer at the belt portion and at the side portion in the pneumatic radial tire shown in FIG. 2 results from the increased diameter at the time of molding.
(3) The edge position means positions of both edges of the carcass layer or the outer circumferential edge of the carcass reinforcing layer.

It can be understood clearly from Table 1 that the present tires can reduce the production cost by lowering the carcass strength coefficient at the belt portion and can keep carcass durability at the same level as that of the prior art tire.

As described above, the present invention sets the carcass strength coefficient to a lower value of 0.35 N/mm·kPa at the tread portion, at which the belt layers bear a part of the tire internal pressure, than in the prior art tires. Therefore, because the number of arranged reinforcing cords of the carcass layer at the tread portion, the diameter of the reinforcing cords, the number of the carcass layers, etc, can be reduced, the materials used can be reduced. Accordingly, the production cost can be reduced.

In the areas from the positions P to the bead portions where the tire internal pressure cannot be borne by the belt layers, the carcass strength coefficient is set to at least 0.5 N/mm·kPa in the same way as in the prior art tires, while it is set to at least 0.15 N/mm·kPa at the tread portion. Consequently, required carcass durability can be secured and tire performance does not get deteriorated.

Industrial Applicability:

The present invention having the excellent effects described above can be utilized extremely advantageously for pneumatic radial tires fitted to vehicles, particularly for pneumatic radial tires for passenger cars.

What is claimed is:

1. A pneumatic radial tire wherein both end portions of a carcass comprising at least one carcass layer formed by arranging reinforcing cords are turned up around right and left bead cores from the inside to the outside of the tire, respectively, and at least two belt layers formed by arranging reinforcing cords in such a fashion that their inclining directions with respect to a tire circumferential direction cross one another in mutually opposite directions between the layers are disposed on the outer circumferential side of the carcass layer at a tread portion, said reinforcing cords of said at least one carcass layer being selected from the group consisting of polyester cords and nylon cords, characterized in that a carcass strength coefficient K of said carcass, defined by the following formula, is set to 0.15 to 0.35 N/mm·kPa for portions of the tread portion on the tread portion center side of positions P and is set to at least 0.5 N/mm·kPa at portions from said positions P to bead portions.

$$K \text{ (N/mm·kPa)} = [\text{number of arranged reinforcing cords (pcs/mm)}] \times [\text{strength of reinforcing cords (N)}] \times [\text{number of carcass layers}] \div [\text{maximum air pressure (kPa)}],$$

and wherein the edges of both turn-up end portions of said carcass extend to said positions P which are between positions away by 25% of the belt width of the belt layer having a second greatest width from a tire center line toward the outside of the tire in a tire width-wise direction and positions away by 10% of the belt width of said belt layer having the second greatest width from both edges thereof toward its inside.

2. A pneumatic radial tire according to claim 1, wherein said pneumatic radial tire is a pneumatic radial passenger car tire.

3. A pneumatic radial tire according to claim 1, wherein carcass reinforcing layers formed by arranging reinforcing cords are disposed outside said carcass at both sidewall portions, the edge portions of said carcass reinforcing layers on the outer circumferential side are extended from said bead portions to said positions P, and said carcass strength coefficient K calculated as the sum of that of said at least one carcass layer and that of said carcass reinforcing layer is set to at least 0.5 N/mm·kPa.

4. A pneumatic radial tire according to claim 3, wherein said pneumatic radial tire is a pneumatic radial passenger car tire.

\* \* \* \* \*